United States Patent [19]
Senften

[11] 3,892,042
[45] July 1, 1975

[54] ELECTRONIC RUN-OUT COMPENSATOR AND METHOD OF ELECTRONICALLY COMPENSATING FOR WOBBLE RUN-OUT IN A ROTATING BODY

[75] Inventor: David A. Senften, Florissant, Mo.

[73] Assignee: Hunter Engineering Company, Bridgeton, Mo.

[22] Filed: Jan. 14, 1974

[21] Appl. No.: 433,212

Related U.S. Application Data

[63] Continuation-in-part of Ser. No. 235,599, March 17, 1972.

[30] Foreign Application Priority Data
Jan. 31, 1973 United Kingdom............... 4972/73

[52] U.S. Cl. ............... 33/301; 33/203.18; 33/288; 33/336; 356/155
[51] Int. Cl. ............................................ G01b 11/26
[58] Field of Search............ 33/203.18, 203, 203.12, 33/203.13, 228, 335, 336, 337, 301; 356/152, 155, 172

[56] References Cited
UNITED STATES PATENTS
2,953,857  9/1960  Mineck........................... 33/203.12
3,546,782  12/1970  Pereue et al..................... 33/203.13

*Primary Examiner*—William D. Martin, Jr.
*Attorney, Agent, or Firm*—Gravely, Lieder & Woodruff

[57] ABSTRACT

Electronic means for compensating for the wobble run-out in a rotating body to determine the true plane of rotation which is perpendicular to the axis of rotation, whereby angular deviation between the axis of rotation and a reference axis may be determined. The electronic means operates on a method which electronically measures the amount of wobble between positions of the body 180° of rotation apart and performs the calculations for any one or a plurality of reference axes at the same time so as to compensate the readings for the run-out error.

8 Claims, 8 Drawing Figures

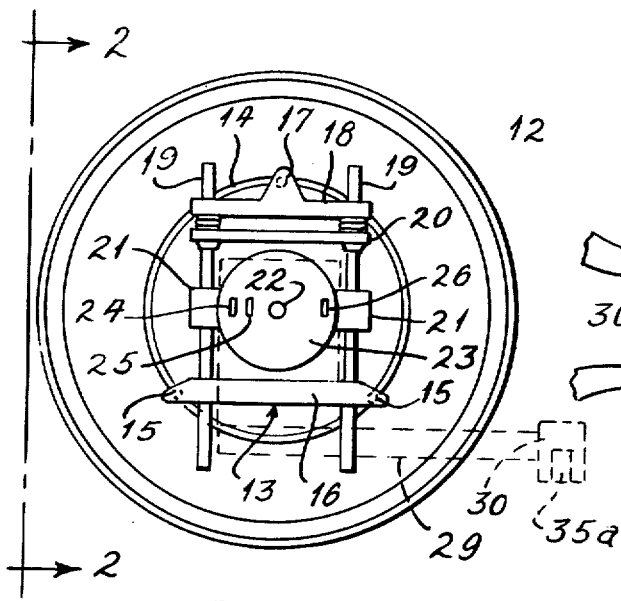
FIG.1
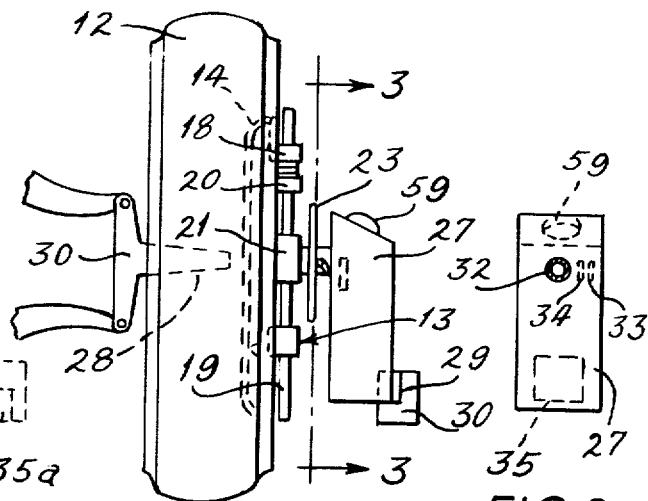
FIG.2
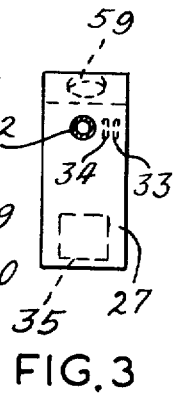
FIG.3
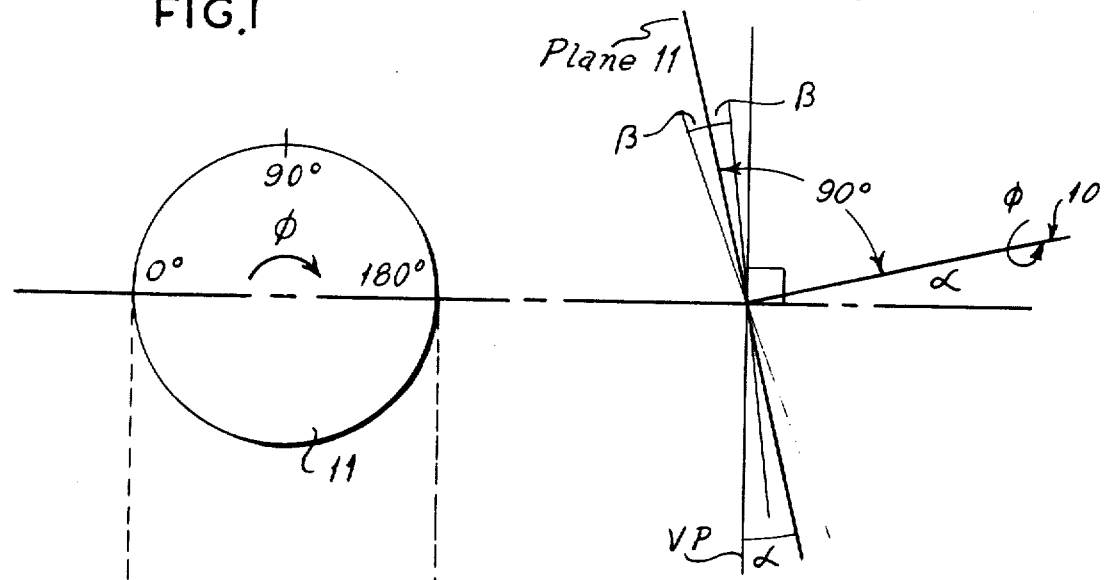
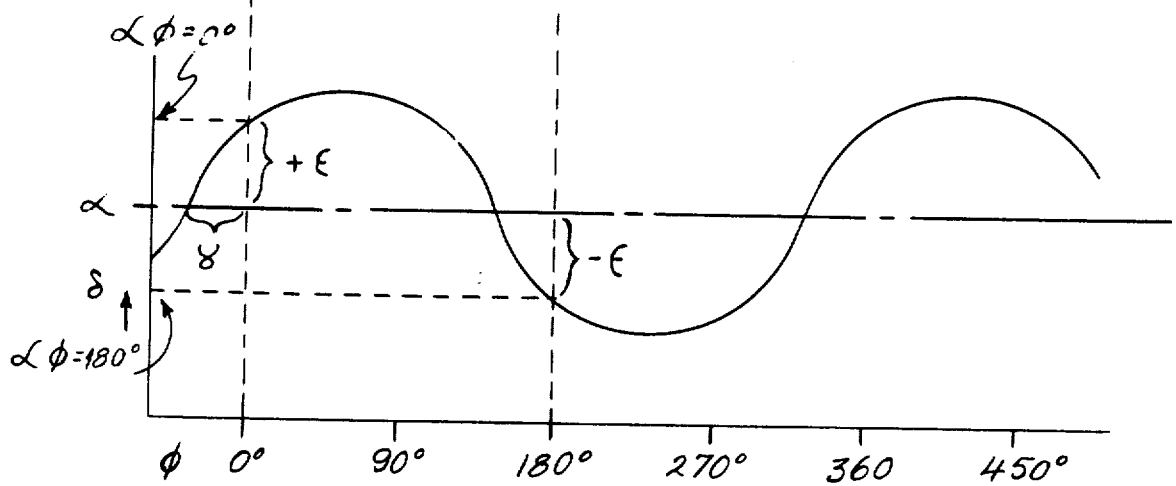
FIG.4

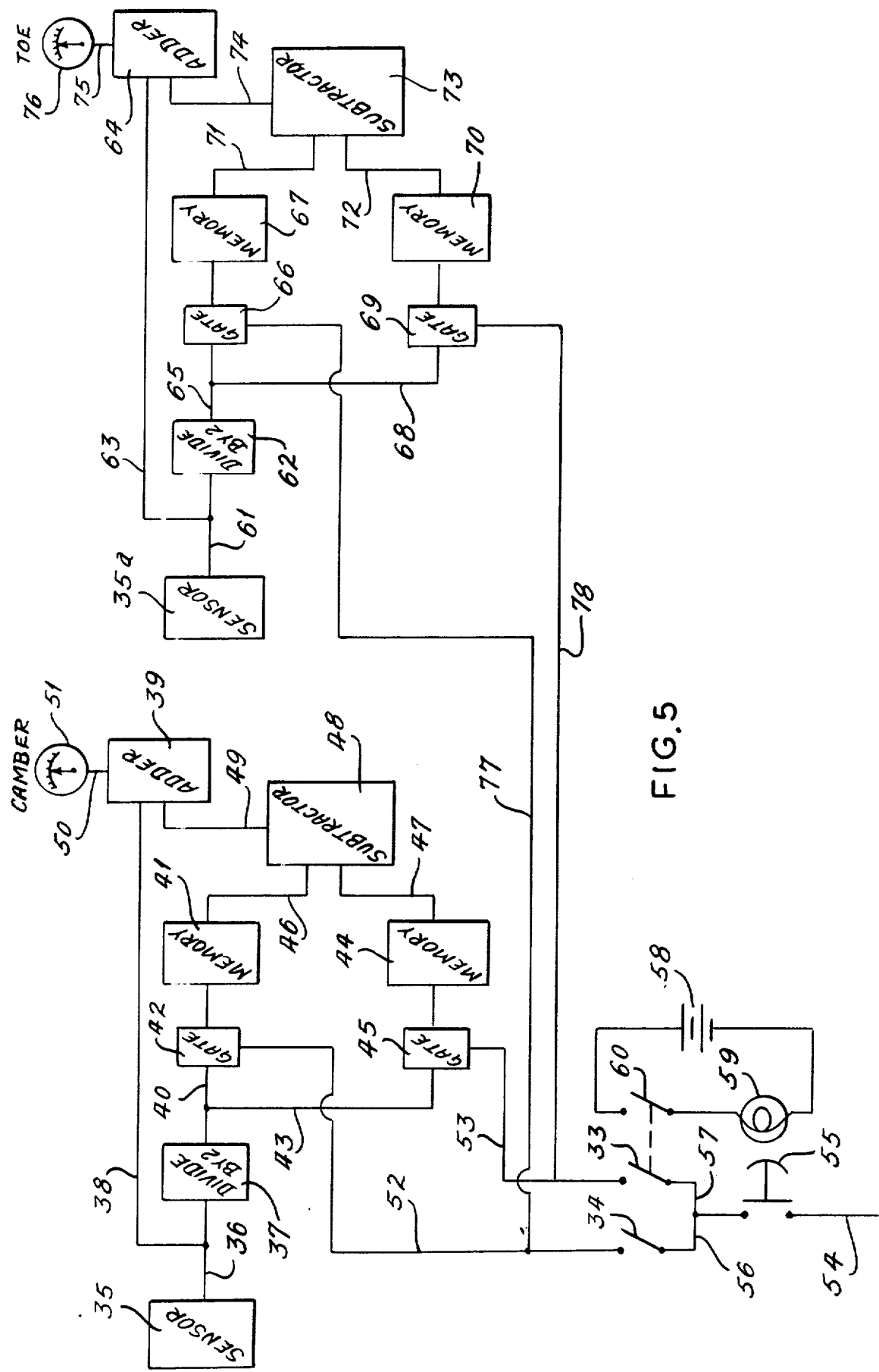

ELECTRONIC RUN-OUT COMPENSATOR AND METHOD OF ELECTRONICALLY COMPENSATING FOR WOBBLE RUN-OUT IN A ROTATING BODY

BACKGROUND OF THE INVENTION

This application for patent is a Continuation-in-part of prior application of David A. Senften, Ser. No. 235,599, filed March 17, 1972.

This invention relates to improvements in run-out compensation for any rotating body having a wobble characteristic relative to a true relationship with its axis of rotation, and more particularly to a method for compensating for wobble by electronic means.

An example of a rotating body that may have a wobble characteristic relative to its axis of rotation is the wheel of a vehicle in which the plane of the wheel rim may not be square or exactly perpendicular with the axle about which it rotates. In such a situation and in order to compensate for the lack of perpendicularity when mounting apparatus on the wheel rim, mechanical compensating means has been provided to average the conditions so that a fairly true perpendicular condition for instrumentation can be obtained for full rotation of the wheel. The mechanical means usually consists in providing at least three adjustable threaded devices between the mounting plate for the instrumentation and a companion plate that is attached to the wheel rim and after adjustment rotates in the plane of the wheel rim. By adjusting the threaded devices the instrument mounting plate can be brought to a position where it does not wobble and is square with the axis of rotation of the wheel. When the mechanical compensation is performed with care, which takes time, the instrument will be true with the axis of rotation. This preliminary operation is necessary where a correct finding of the plane of wheel rotation is needed in order to determine the toe or camber angle characteristic of the wheel before any correction operations can be made.

The wheel camber angle is relative to the vertical plane and related to a true horizontal axis of rotation. The positive camber angle involves setting the wheel so its bottom is inside its top by some small angular amount. The wheel toe angle, on the other hand, is related to the horizontal plane of rotation of the wheel and involves setting the wheel so its forward horizontal portion is set inside its trailing horizontal portion by some small angular amount for toe-in. These two angular wheel positions are well known in the art of vehicle wheel alignment for proper running conditions. The camber angle and toe angle are always 90° to each other since camber is related to the vertical plane and toe is related to the horizontal plane.

The present invention accomplishes run-out compensation by methods utilizing devices which electronically compensate for run-out characteristics of a rotating body so that no mechanical adjustments are needed as in the older mechanical devices. The result is greater accuracy, speed and simplification of the work of determining the camber and toe angles.

In a preferred embodiment a suitable sensor, responsive for either orientation in the vertical plane or in the horizontal plane, is disposed on the wheel adjacent a reference plate which rotates with the wheel. The sensor has its output connected into a system of electronic devices which store the signal values for any two predetermined positions of the reference plate 180° apart. The signals are electronically resolved and a meter gives the resultant read out in terms of the angle desired.

In applying the electronic compensation for wheel run-out or wobble it is known that the wobble follows a sinusoidal curve as the wheel is rotated about its axis or spindle. The read-out meter in the electronic system will show the sine wave since it will swing back and forth to either side of some base-line reading as the wheel is rotated. At any two points of the sine wave 180° apart, the deviation of the meter is equal and opposite. Thus, by choosing any two points 180° apart and electronically adding the values and dividing by two, an average is obtained which gives true plane of the wheel relative to its axis or spindle. This result can also be achieved by subtracting the two readings, dividing the difference by two and adding that correcting factor to the first reading.

BRIEF DESCRIPTION OF THE DRAWINGS

The embodiment of the invention for accomplishing the method of electronic run-out compensation of a rotating body or vehicle wheel is shown in the accompanying drawings, wherein:

FIG. 1 is an elevational view of a vehicle wheel showing the device by which electronic sensors are mounted thereon;

FIG. 2 is an end elevation of the vehicle wheel seen at line 2—2 in FIG. 1;

FIG. 3 is a view of the sensor and switch housing as seen at line 3—3 in FIG. 2;

FIG. 4 is a diagrammatic showing of the condition by which run-out compensation may be illustrated;

FIG. 5 is a circuit diagram showing the components of the electronic system by which the present method is practiced for vehicle wheel camber and toe determinations;

DESCRIPTION OF THE DRAWINGS

Figure 7:
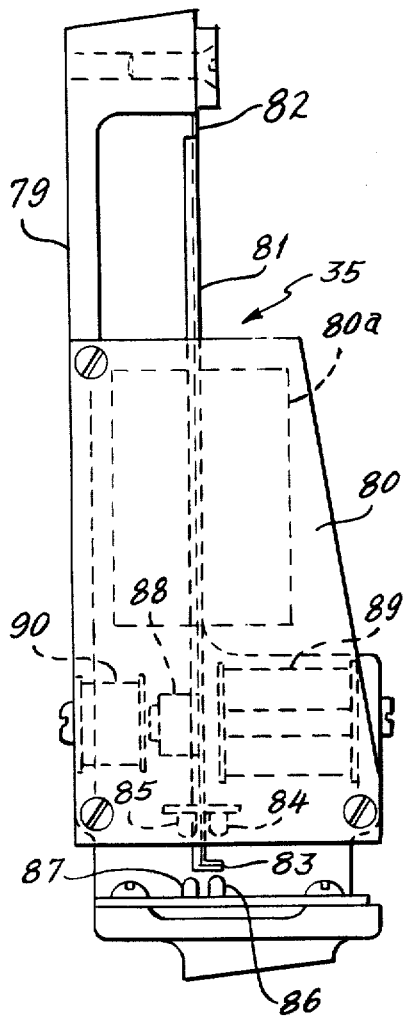
FIG. 7 is an elevational view of a vertical sensor device for the run-out compensating means.

Reference will first be made to FIG. 4 as an explanation of the diagrammatic view will furnish a basis for a better understanding of the method of this invention and the apparatus by which the method is practiced. It is assumed that shaft 10 rotates about an axis X—X which is at some angle alpha ($\alpha$) with respect to the horizontal reference Y—Y. A plate is attached to the end of shaft 10, and if the plate were set at 90° to the axis X—X of shaft 10 it would rotate in the plane 11 without any wobble.

If it is assumed that the plate is mounted at some angle other than 90° to the shaft axis X—X, say beta ($\beta$) degrees from the plane 11, it is obvious the plate would wobble as shaft 10 rotated. It will, in fact, wobble beta degrees on either side of the plane 11 during each revolution of shaft 10. It is well known that the wobble motion is given by the equation $\theta = \sin(\phi+\gamma)$, where Gamma ($\gamma$) is the rotational orientation constant of the sensor mounting and the wheel wobble. The orientation of the plate above referred to with respect to the vertical plane represented by the line VP is given by the equation $$\delta = \alpha + \theta = \alpha + \beta \sin(\phi + \gamma)$$

The values of sin $\phi$ at points 180° apart are always equal but opposite in sign. Therefore: for $\phi=0°$, $\delta\phi=0°=\alpha+\epsilon$ and for $\phi=180°$, $\delta\phi=180°=\alpha-\epsilon$, where $+\epsilon$ is some wobble angle $\beta\sin(0°+\gamma)$ and $-\epsilon$ is some wobble angle $\beta\sin(180°+\gamma)$.

The actual shaft angle $\alpha$ can then be calculated from the orientation of the plate rotating in the plane 11 by equation:

$$\alpha = \frac{\delta\phi=0° + \delta\phi=180°}{2} \quad \text{Equation 1}$$

Proof: $\alpha = \dfrac{\delta\phi=0° + \delta\phi=180°}{2} = \dfrac{(\alpha+\epsilon)+(\alpha-\epsilon)}{2} = \dfrac{2\alpha}{2} = \alpha$ or by equation:

$$\alpha = \delta\phi=0° + \left(\frac{\delta\phi=180°-180°}{2} - \frac{\delta\phi=0°}{2}\right) \quad \text{Equation 2}$$

Proof: $\alpha=\delta\phi=0°+ \left(\dfrac{\delta\phi=180°}{2} - \dfrac{\delta\phi=0°}{2}\right) = (\alpha+\epsilon)+ \dfrac{(\alpha-\epsilon)}{2} - \dfrac{(\alpha+\epsilon)}{2} = (\alpha+\epsilon)+ \dfrac{-2\epsilon}{2} = \alpha+\epsilon-\epsilon=\alpha$ It is obvious that these calculations would be valid for planes of reference other than the vertical as well.

In FIG. 4 the plate 11 is shown in front view to place the angular relationship of rotation of points thereon in a position where it may easily be seen how a sinusoidal motion is involved. The sine wave in this view is expanded sufficiently to permit outlining graphically the mathematical terms to be discussed presently.

Referring now to FIGS. 1 and 2, a vehicle wheel 12 has an adapter assembly 13 mounted on the wheel rim 14 by a pair of pins 15 mounted in a lower frame 16 and by a top pin 17 mounted in an upper frame 18. The frames 16 and 18 are connected by a pair of rods 19 with the frame 18 connected by clamp means 20 such that the pins 15 and 17 are spread apart to obtain a firm bite on the wheel rim 14. The adapter assembly is provided with an intermediate frame 21 which can be slidably moved up or down so that the shaft 22 thereon may be located opposite the axis of rotation. The shaft carries a reference plate 23 which rotates with the wheel 12, and the plate is provided with a pair of apertures 24 and 25 at 30° above the horizontal one side and a single aperture 26 located 180° away and on the same circle with aperture 24.

In FIG. 2, the shaft 22 on the intermediate frame 21 extends outwardly of the reference plate 23 for receiving a housing 27. The housing 27 is free on the shaft 22 and hangs penduluously therefrom so it always remains in a vertical position. Housing 27 supports a horizontally directed arm 29 and on the outer end is mounted a housing 30 in which a sensor 35a is incorporated for the proper operation of the toe devices mounted in the housing 30. The housing 27, arm 29 and housing 30 for sensor 35a are shown in phantom in FIG. 1. The wheel 12 rotates about its spindle 28 which is attached to the vehicle (not shown) by the usual upper and lower arms through joints on the spindle bracket 31.

In FIG. 3 the inner face of the housing 27 is shown with an aperture 32 to receive the shaft 22. A pair of switches 33 and 34 are carried by the housing 27 in position such that when the housing is mounted on shaft 22 switch 33 has its feeler in position to engage apertures 24 and 26, and switch 34 has its feeler in position to engage only aperture 25. Thus, when the wheel 12 is rotated, the reference plate 23 rotates also, and the apertures 24 and 25 will close switches 33 and 34 at one angular position and aperture 26 will close only switch 33 at an angular position 180° away from the first stated angular position. The operation of the switches 33 and 34 in this manner will control electrical sensor signals at two wheel positions 180° apart.

In FIG. 5 the electronic system has been shown diagramatically, as the individual components per se are known by those expert in the electronic art. In the diagram there is a sensor device 35 which is responsive to deviations from the vertical position of the housing 27 (see FIG. 3). The signal generated by the sensor 35 is responsive to the vertical orientation of the housing, and the signal is transmitted along lead 36 to a divide by two unit 37 and also along lead 38 to an adder unit 39. The divider unit 37 is connected by lead 40 to a first memory unit 41 through a gate device 42, and by lead 43 to a second memory unit 44 through a gate device 45. Leads 46 and 47 from the memory units 41 and 44 respectively connect to a subtractor unit 48. The output of the subtractor unit 48 is connected by lead 49 to the adder 39, and the adder output lead 50 is connected to the visual read-out meter 51.

The circuit diagram of FIG. 5 includes a lead 52 from the gate device 42 to the switch 34, and lead 53 from gate device 45 to the switch 33. The power input lead 54 runs through switch 55 to both switches 33 and 34 by leads 56 and 57. An auxiliary power source or battery 58 is in a lamp circuit where the lamp 59 is in the button for switch 55. A lamp energizing switch 60 is in the lamp and battery circuit, and the switch 60 is tied to switch 33 so it will close when switch 33 is closed at each of the positions for apertures 24 and 26 as the reference plate 23 rotates the apertures 24, 25 and 26 to the position where the switches 33 and 34 are located. Thus far the description of FIG. 5 has been given with reference to wheel camber determination.

FIG. 5 includes also an electronic system by which wheel toe may be determined. Since compensation for wobble must be performed for both camber and toe determination, essentially the same electronic system is used in each case. For toe determination, the housing 30 (FIGS. 1 and 2) is provided with a sensor 35a which generates a signal relative to the horizontal orientation of the wheel rim 14. The sensor 35a connects by lead 61 with a divide by two unit 62 and by lead 63 to an adder 64. The divider 62 connects by lead 65 and gate device 66 to a memory unit 67. The divider also connects by lead 68 and gate device 69 to a memory unit 70. The output from the memory units 67 and 70 is connected by respective leads 71 and 72 to a subtractor 73. The subtractor is connected by lead 74 to the adder 64, and lead 75 from the adder connects to a read-out toe meter 76. Activation of the toe circuit system is obtained with the same switching means 33 and 34 as for the camber circuit system first described. Thus, leads 77 and 78 are connected into leads 52 and 53 respectively. The difference in the two circuit systems resides in the responsiveness of the sensors 35 and 35a which are 90° out of phase during wheel rotation.

The apertures 24, 25 and 26 are shown in positions along the horizontal when the adapter assembly 13 is in a vertical position. The setting of the adapter is selected for convenience in visually noting when the wheel 12 has been rotated 180°. However, the apertures could be located in any orientation so that 180° wheel rotation would effect closing of the switches in a predetermined order and illumination of the lamp 59 in the button for switch 55.

Figure 8:
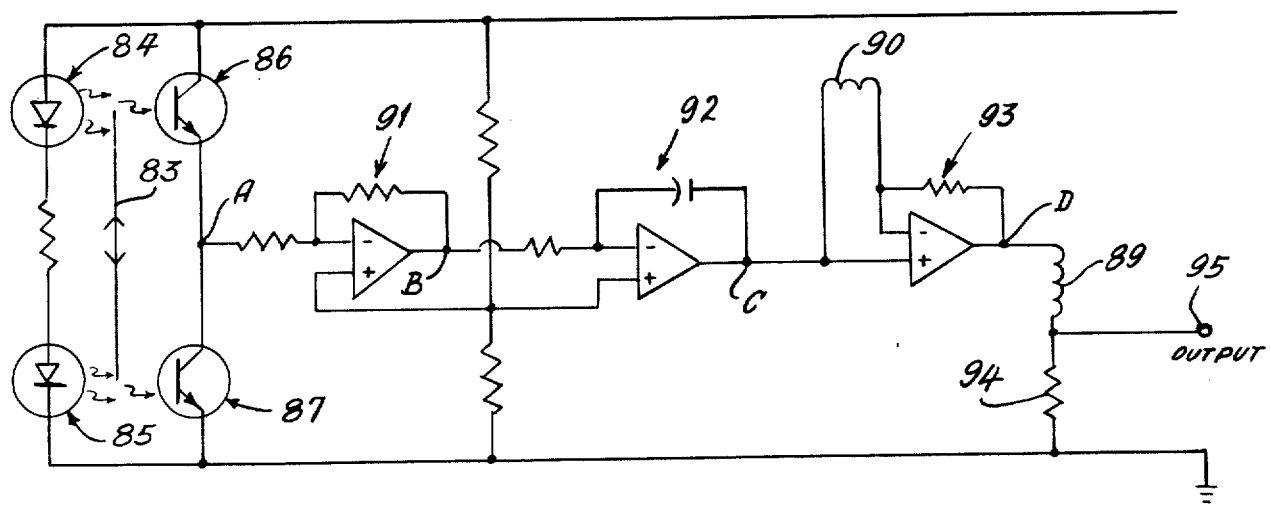
FIG. 8 is a circuit diagram of the electronic means associated with the sensor means of FIG. 7.

Reference has been made to sensors 35 and 35a which supply signals for the circuit of FIG. 5. The sensor 35 is responsive to the movement of the hanging housing 27 and comprises a servo accelerometer seen in detail in FIGS. 1, 7 and 8. The frame 79 is mounted in the housing 27 and carries a circuit board 80 by which the electronic circuit of FIG. 8 is carried in an enclosure 80a. The frame carries a flat pendulum member 81 which is movable about its upper flexural pivot 82 so that the lower end 83 is movable in a space between a pair of spaced light sources 84 and 85 and aligned photocells 86 and 87. At a suitable location above the end 83 of the pendulum there is a fixed permanent magnet 88. In the adjacent portion of the frame 79 a coil 89 is mounted such that it sets up a magnetic field that has its polarity chosen to repel the magnet 88. This repulsion causes the pendulum to move and the lower end 83 therefore moves in the space between the light sources 84, 85 and the aligned photocells 86, 87 to control the light responsive action of the photocells by altering the amount of light from the spaced (or split) light source which falls on the spaced (or split) photocells 86, 87. This motion of the pendulum 83 causes the photocells to respond such that one increases its signal while the other decreases its signal.

The signals from the photocells 86 and 87 are applied to the control circuit of FIG. 8 and cause the current in coil 89 to adjust to a level which causes the pendulum end 83 to return to a position where substantially equal amounts of light reach the respective photocells. The sensor 35 also is provided with a small coil 90 that senses motion (not position) of the pendulum 81 and generates a signal which is applied to help damp out oscillations of the pendulum.

It can be assumed, as an example, that the housing 27 is moved so that the sensor frame 79 (FIG. 7) tilts to the right. The pendulum 81 will respond and move toward the coil 89, and in moving in this direction the pendulum end 83 will restrict the light falling on photocell 86 and increase the light falling on photocell 87. In the circuit of FIG. 8, it can be seen that the current flow into point A from photocell 87 will increase while current out of point A through photocell 86 will decrease, thereby causing the voltage at point A to rise which, in turn, causes the voltage at point B to lower by a much greater extent due to the gain of the signal amplifier 91. The lowered voltage at point B causes the output of the integrator 92 at point C to integrate upwards. The output of the power amplifier 93 at point D will follow the rising voltage level at point C and thereby increase the current through coil 89 and resistor 94 proportionally. The circuit will continue to function in this described manner until the current has increased to a level such that the magnetic field produced by the current in the coil 89 is strong enough to force the free end 83 of the pendulum back to its original position where equal amounts of light again fall on the respective photocells 86 and 87.

The function of the circuit of FIG. 8 is to produce a voltage signal at the output 95 by measuring the voltage developed across the resistor 94 due to the current from coil 89 passing through it. This voltage is, of course, directly proportional to the current in coil 89. The magnetic field strength of coil 89 is also directly proportional to the current and therefore proportional to the voltage developed at the output 95. The force developed between the field of the permanent magnet 88 and the field produced by coil 89 is also directly proportional. It follows again that the voltage at the output 95 must be proportional to the force developed between the free end 83 of the pendulum 81 and coil 89 brought about by the coupling of the two magnetic fields. From this it can be appreciated that the force necessary to hold the free end 83 of the pendulum in position centered between the photocells 86 and 87, as the whole frame 79 is titled, is proportional to the sine of the angle of tilt relative to the vertical. For small angles of tilt the force is directly proportional to the angle itself. As a final result it can be appreciated that the voltage developed at the output 95 of the sensor 35 is directly proportional to the sine of the angle of tilt off the vertical and for small angles is proportional to the angle itself.

Figure 6:
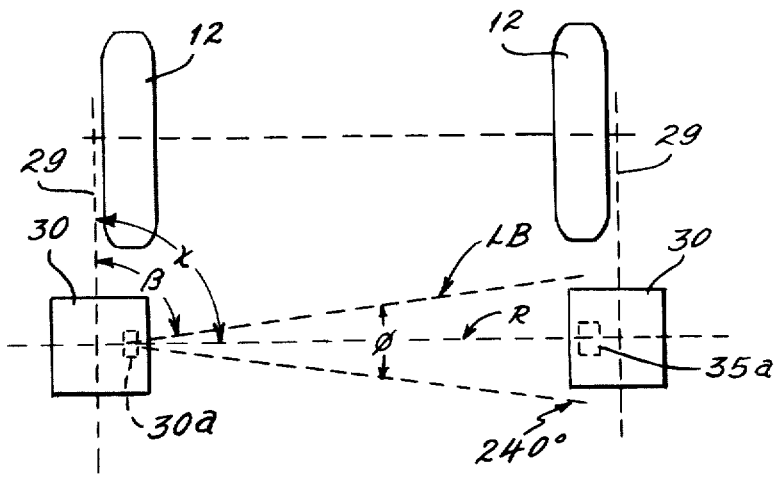
FIG. 6 is a diagrammatic view of the sensor means for obtaining the horizontal orientation of the run-out compensating means.

The sensor 35a of FIG. 1 is responsive to the horizontal plane of rotation of the wheel. The details of such a sensor have heretofore been disclosed in the prior application of David A. Senften, Ser. No. 196,034, filed Nov. 5, 1971, now U.S. Pat. No. 3,782,831 of Jan. 1, 1974. FIG. 6 is a diagrammatic view of the relationship of the sensors on the respective wheels, all as described in said prior application. As there set forth, the determination of the orientation of either wheel 12 in the horizontal plane can be developed by a light projector 30a oriented relative to the wheel plane so as to normally direct its light beam along a reference line R toward the opposite wheel 12 and thereby have a known angular relation with the wheel plane. The light beam on the left wheel 12 is swept through the angle $\phi$ (phi) from time zero corresponding to angle $\beta$ (Beta) to the position of angle X when the beam B strikes the sensor 35a to excite a signal. The beam continues its sweep through a total angle of 240° and then returns to the starting position.

The light sensing means 35a is supported on the opposite wheel 12 and on the reference line R, and drive means (not shown) causes the projector 30a to swing independently of the wheel and to either side of its known angular relation to the wheel plane. The light sensitive means 35a is caused to generate a signal response on receiving the light beam at the angular deviation from its known angular relation. Thus, the light sensor response provides a signal that is the analogue of the horizontal angular orientation X. Wheel toe may be determined in this manner, and it also allows the operator to determine the angular orientation in the horizontal plane of wheel rotation about its axis of rotation.

The plane of wheel rotation is, in this example, represented by the reference plate 22 in FIG. 2. Each of the housings 30 is supplied with a light projector 30a and a sensor 35a, whereby the sensor of the right wheel provides the signal by which the left wheel horizontal plane orientation is found and the reverse situation is true for the left wheel.

METHOD OF COMPENSATING FOR RUN-OUT

The method embodied in the apparatus disclosed above, once the apparatus has been mounted on the wheel 12 by the adapter 13, or its equivalent, is to rotate the wheel 12 in either direction until the lamp 59 (FIG. 5) lights up due to the switches 33 and 34 dropping into the apertures 24 and 25 in the reference plate 23 and the switch 33 closing the lamp circuit switch 60. The operator at this moment stops the wheel and presses the button of switch 55 to actuate gate devices 42, 45 and 66 and 69 for the related memory units 41 and 44, and units 67 and 70. At this time the responsive signals from the sensors 35 and 35a, after passing through the divide by 2 units 37 and 62, are received by the memory units 41, 44, 67 and 70. The output from the memory units passes to the subtractor units 48 and 73, and to the adder units 39 and 64. The memory units are now conditioned for the first part of the operation.

The operator now turns the wheel 12 until the lamp 59 goes on again after being rotated 180°, and this time only gates 42 and 66 are opened when switch 55 is pressed because switch 33 is the only one actuated. New signals from the sensors 35 and 35a (because of the wobble) are transmitted to the adders 39 and 64, and half that signal passes from the dividers 37 and 62 through gates 42 and 66 to memory units 41 and 67. Upon rotating the wheel 12 back to its starting position, the signals, as shown on read-out meters 51 and 76, will be composed of the elements of equation 2 $\alpha = \delta\phi = 0° + (\delta\phi = 180°/2 - \delta\phi = 0°/2)$. The real-time signals from the sensors $\delta\phi = 0°$ are, therefore, electronically compensated for the wobble run-out of the wheel.

What has taken place for both camber and toe is that the position sensors 35 and 35a respond to the position of the wheel rim 14 relative to a horizontal and a vertical reference and send out signals which are handled electronically through the switching and memory unit systems and also directly to the adder devices to produce a visual read-out. By taking readings at points 180° apart, the method has used points on a sine wave which are equal and opposite. The readings are divided by 2 and subtracted. The resultant is added to the $\phi = 0°$ rotation sensor signal and thereby compensates it for the wobble run-out. The meters 51 and 76 are calibrated to read in degrees of camber and toe angles respectively.

In summary, the system of FIG. 5 electronically produces readings of camber and toe alignment measurements of the wheel 12 at two positions of rotation 180° apart. This is accomplished by switches 33 and 34 responsive to cams or the apertures 24, 25 and 26 (negative cams) and the manual switch 55 for the operator. A reading is taken at one position of the wheel 12, then the wheel is rotated 180° where the lamp 59 lights up and another reading is taken simply by depressing switch 55. The difference of these two readings is extracted and divided by two electronically. The compensation corrective factor is then algebraically added to the first readings. This corrects the actual alignment measurements for the axial misalignment of camber and toe, as long as the wheel remains in the rotational position reached during the first compensation reading. Compensation can also be accomplished by the above method if the wheel 12 is left in its 180° position after the second reading is taken, and the compensation correction factor is algebraically subtracted from the actual alignment measurements.

The circuits of FIG. 5 may conveniently be housed in a console remote from the wheel 12 and the sensors 35 and 35a in housings 27 and 30 respectively. The read-out meters 51 and 76 are usually positioned for easy reading by the operator as the wheel 12 is rotated to each of the positions 180° apart. Furthermore, referring back to the disclosure in FIGS. 1 and 2, it should be mentioned here that the sensor 35a is utilized for determining run-out compensation in connection with apparatus heretofore disclosed and claimed in the application of David A. Senften Ser. No. 196,034, filed Nov. 5, 1971. Accordingly, the sensor 35a is mounted in a housing 30 suitably positioned by a horizontally directed arm 29 carried by housing 27. Although not shown here, the arm 29 is suitably counterweighted so as not to disturb the pendular position of the housing 27.

What is claimed is:

1. A method for finding the wobble run-out of a rotary body relative to its true axis of rotation, said method consisting in providing a pair of signal generating sensor means sensitive to orientation of the rotary body at 90° to each other, rotating the body into two predetermined positions 180° apart to generate corresponding sensor signals at each said position of the body, said signals being separate and independent and indicative of the body orientation at said predetermined positions, and electronically subtracting the sensor signals corresponding to the positions 180° apart to find the wobble run-out relative to the true axis of rotation, and displaying the sensor signals, corrected by half the difference obtained from said signal subtraction, as an angular relation between the true axis of rotation and the desired axis.

2. A method for finding the wobble run-out of a rotary body relative to its true axis of rotation, said method consisting in providing elecronic signal analyzing means for each of two body positions of rotation 180° apart, producing two separated and independent signals, one at each position of the body when rotated to said 180° apart positions, said signals being responsive to the orientation of the body plane substantially 90° apart, feeding said signals into said signal analyzing means at each of said two body positions, and activating said signal analyzing means at each of said body positions 180° apart.

3. In electronic run-out compensation apparatus for a rotatable body, the combination therein which comprises a reference member attached to the rotatable body in position to produce a sinusoidal response to the motion of the body which is the analogue of the wobble run-out, spaced means on said reference member to represent two body positions 180° apart, a first sensor responsive to the orientation of said reference member in a given plane, a second sensor responsive to the orientation of said reference member in a plane 90° displaced from the plane of response of said first sensor, means mounting said sensors on said reference member, electronic circuit means connected to each sensor and including signal analyzing means to resolve the signals from said sensors and provide compensation to correct for the body wobble run-out, a pair of switch means carried by said mounting means in position to be actuated by said spaced means on said reference member, a position indicator connected into said switch means to visually determine the attainment of body positions 180° apart, and analyzer activating means connected through said switch means to activate said signal analyzing means in said electronic circuit means and cause said latter circuit means to receive and convert the signals obtained at the body positions 180° apart.

4. The apparatus set forth in claim 3 wherein said signal analyzing means includes memory devices to receive said sensor signals, and gate means connected to said memory devices, said gate means being activated by said signal activating means in a predetermined order relative to the rotation of said body into said two body positions 180° apart.

5. The apparatus set forth in claim 3 wherein said signal activating means includes a manual switch operable to activate said electronic circuit means at said body positions 180° apart.

6. The apparatus set forth in claim 5 wherein said manual switch means includes an operator signalling device operable at each of said body positions of rotation 180° apart, said signalling device indicating the attainment of said body positions for operation of said manual switch.

7. The apparatus set forth in claim 3 wherein said signal analyzing means in each sensor electronic circuit means consists of a divide-by-two circuit, two-gated memory devices each having inputs connected to said divide-by-two circuit and outputs, a subtractor device connected to said output of each of said memory devices, an adder device connected to its sensor and to said subtractor device, said circuit devices being operated to supply the sensor signal to said adder device and half the sensor signal to said pair of gated memory devices and thence to said subtractor device to provide a corrective factor for said adder device, and said switch means energizing said memory device gates in a predetermined order upon operation of said analyzer activating means at said body positions 180° apart.

8. The apparatus set forth in claim 3 wherein said spaced means on said reference member are camming devices, and said pair of switch means being disposed by said mounting means to be actuated together by said camming devices in one body position, and said camming devices actuating only one of said switch means in the body position 180° apart from said one body position.

* * * * *